July 21, 1959  J. TANNENBAUM  2,896,157

SYSTEM FOR TESTING AN AMPLIFIER

Filed May 18, 1956  3 Sheets-Sheet 1

INVENTOR.
Jerome Tannenbaum
BY Robert L. Kahn.

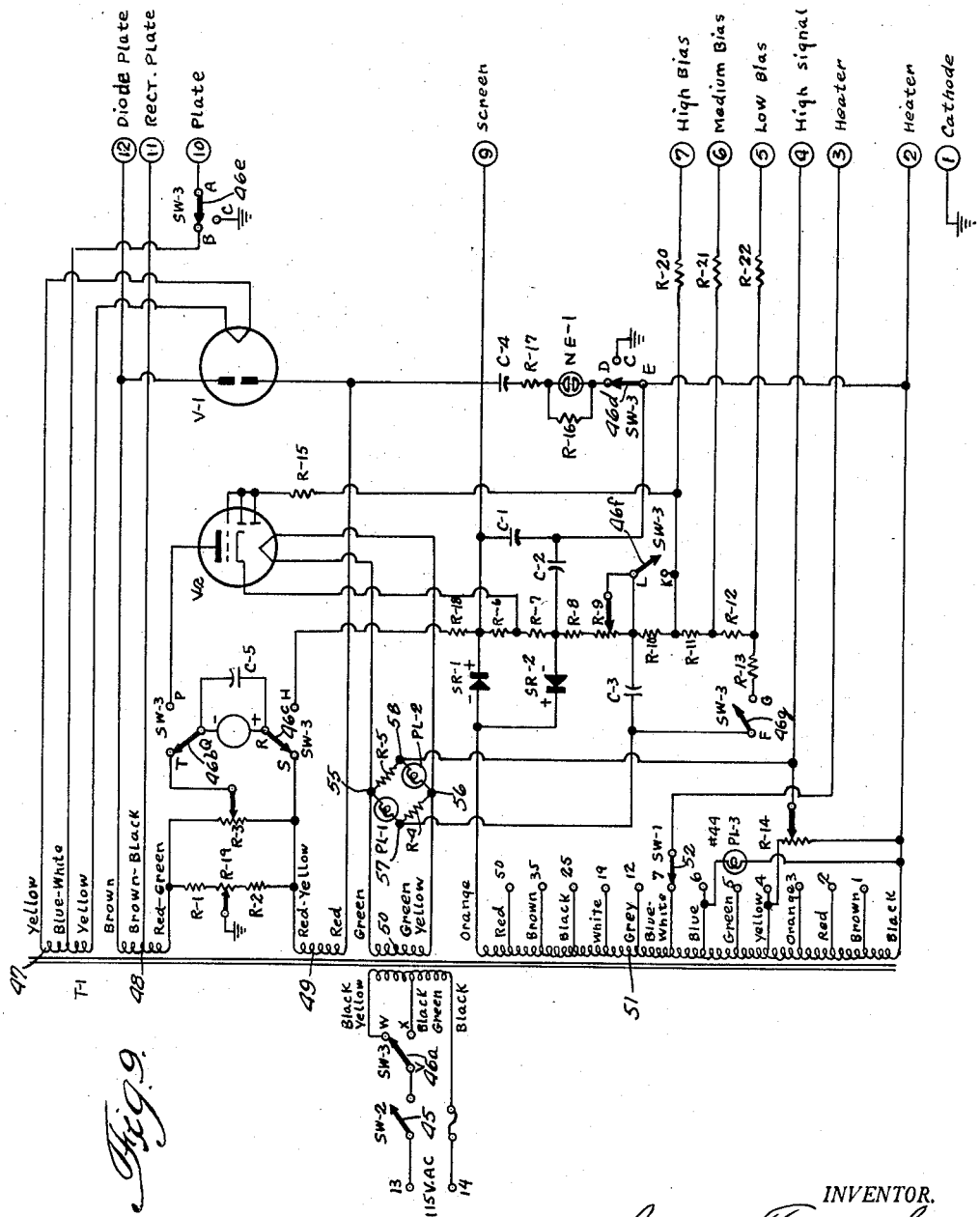

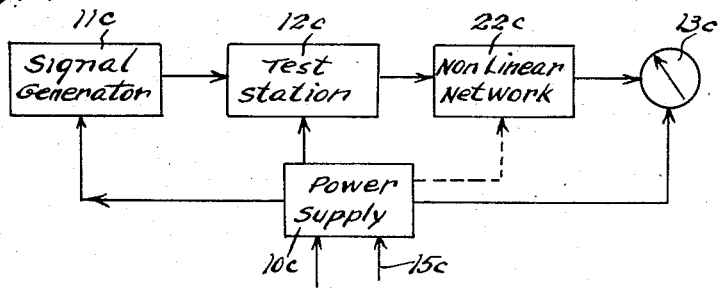
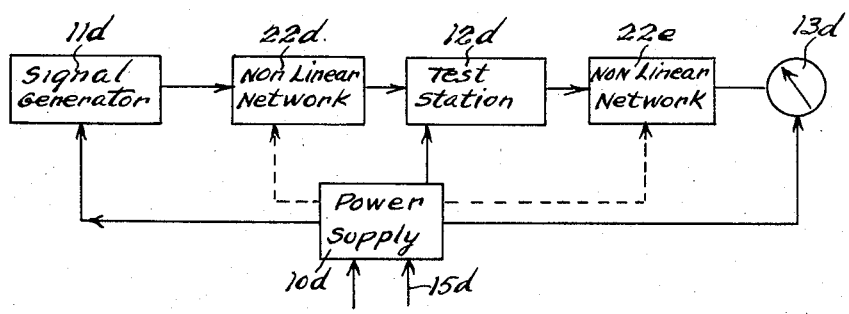
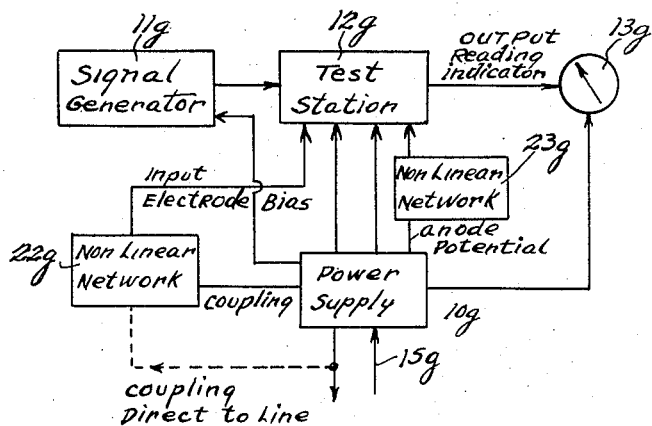

United States Patent Office 2,896,157
Patented July 21, 1959

2,896,157

SYSTEM FOR TESTING AN AMPLIFIER

Jerome Tannenbaum, Chicago, Ill., assignor to B & K Manufacturing Co., Chicago, Ill., a corporation of Illinois Application May 18, 1956, Serial No. 585,752

4 Claims. (Cl. 324—57)

This invention relates to an electrical apparatus and more particularly to a tester for vacuum tubes and transistors.

It is well known that vacuum tubes and transistors are used as oscillators, amplifiers and detectors. Irrespective of the use to which a tube or transistor is put, its satisfactory operation, particularly as an amplifier for both amplifier and oscillator use, depends upon the stability of certain characteristics. Thus for example in the case of vacuum tubes, there may be as many as six different electrode voltages which are important for the proper testing of the tube. One characteristic tested is the amplification factor (the ratio of small variation of plate potential to a small variation in control grid potential while the average plate current is maintained constant). Another characteristic is transconductance (the ratio of variation of plate current to a small variation of control grid potential). Other characteristics such as plate resistance, screen resistance and screen mu factor (where the tube has screen electrodes) also may be tested. Cathode emission is also important. A transistor has certain corresponding characteristics.

In the case of vacuum tubes, a number of potentials which must be applied to the tube electrodes must be maintained at predetermined constant values for proper test readings. As an example, a vacuum tube requires a heating current for both directly and indirectly heated type of tubes. It is well known that an increase in cathode temperature will result in a substantial non-linear increase of electron emission from the cathode surface. The ratio of electron emission to cathode temperature varies in accordance with the 3/2 power. This emission factor is not involved in transistors.

However, in both vacuum tubes and transistors, the magnitude of potential applied to the input and output electrodes will have a substantial bearing on the magnitude of the output current and potential. In the case of a dynamic transconductance type of tester for tubes or transistors, where the device under test is being subjected to an alternating signal potential, it is necessary to maintain the various operating potentials including the signal potential constant so that the test readings may be relied upon.

The problem of stability of test conditions for tubes and transistors arises in connection with testers which are energized by alternating current from power lines. While theoretically power lines are supposed to have a constant alternating potential, this is not really the case. Thus the so-called 110 volt power line may vary in different neighborhoods from a low of 100 or 105 volts to as much as 125 volts. Many pieces of apparatus are designed for an average voltage of 115 or 117. Not only will the voltage vary from one neighborhood to another, but the voltage will even vary in the same neighborhood, depending upon the time of day and upon the load conditions in the house or apartment or plant where a tube tester is used.

In order to compensate for varying line voltages applied to a tube tester, it has been customary to provide a volt meter for measuring line voltage and a rheostat for adjusting the magnitude of line voltage to a normal value so that theoretically a uniform line voltage will always be impressed upon the tube tester itself.

In practice, many operators forget or omit to make the line adjustment and the variation of line potential may make manual adjustment difficult if not impossible. In any case, this adjustment is time consuming.

It is possible to feed the line current through a constant potential output transformer. Such devices operating on saturation core principle may provide a substantially constant output voltage over a range of input voltages, provided that the load is constant. Apart from the great expense involved in providing a constant potential transformer for a tube tester and the added bulk is the additional factor that a constant load network will be required. As a result, a tester for a vacuum tube or transistor would be rendered expensive, bulky and complicated if used with a constant potential type of transformer.

Any conventional tester with a constant potential input would not be entirely satisfactory since the power supply in the tester should be so constructed as to provide constant output potentials irrespective of load variations. It should be remembered that a tester is likely to be called upon to test a large variety of tubes in all conditions ranging from bad to excellent. But a power supply with excellent regulation is difficult and expensive to provide and in general may create more problems than it solves.

In accordance with this invention, there is provided at least one non-linear network in the input channel or output channel or both of the device under test, said non-linear network having its output potential varying in such manner with relation to its input potential as to provide suitable compensation for variations of line potential or load currents or both over a substantial range.

The term "non-linear network" is used in the well accepted manner in circuit theory to define a network whose parameter or parameters (resistance, inductance, etc.) do not remain constant with network current variation. The "non-linear" designation does not necessarily mean that a network parameter, as resistance, for example, must necessarily vary non-linearly with respect to current. In practice, however, many devices useful in the partice of the present invention do vary non-linearly with respect to current at some part of their operating ranges.

In the case of a vacuum tube tester energized from a conventional power line, means are provided for deriving a signal voltage from said power line and impressing the same upon the input of the tube or transistor under test. In the input or output channel of the tube or transistor under test, or in both channels, and in accordance with the present invention, non-linear networks having some coupling to the power supply are disposed. If, for example, the signal voltage as well as other electrode voltages should happen to increase above normal, due to a rise in line voltage, then suitable correction is applied either to cut down the signal voltage to be applied to the device under test or to cut down the abnormally high output of the device under test, or do both in a suitably combined manner so that, within substantial limits, the tube or transistor under test will give a true reading of the characteristic being measured. The same will be true with a low line voltage.

As an example, a vacuum tube tester may have a non-linear network in the input channel through which the signal to be impressed upon the tube or transistor under test must pass. In one form of the invention, a non-linear network will have a negative output potential characteristic. In case of a high line voltage, an increase in magnitude of signal impressed upon the network will result in a decreasing network output. Any increase in signal input above normal will be compensated for by a decrease in output of the non-linear network so that the signal strength applied to the device under test is dropped to a below normal value. The converse will be true with a low line potential.

In another form of the invention, the non-linear network may have a rising output voltage characteristic. The output of such a network will be fed out of phase with the signal impressed upon the input of the device under test. Thus the net signal available at the input of the device under test will decrease with increase in magnitude of the original signal due to an increase in line potential. The converse will be true with a low line potential. The same general application of non-linear networks may be made to the output of the device under test.

It is possible also to have non-linear networks in both the output and input channels of the device under test, the overall characteristics being so designed as to provide for a true test reading in spite of variations of line potential. When so combined, one or other or both networks may have drooping or rising output characteristics or one network may have one kind of characteristic and the other network may have an opposite kind. In all cases, the network characteristics will be non-linear.

It is also possible to have one or more non-linear networks in the circuits for energizing one or more electrodes of the device under test. It is possible, for example, to have a non-linear network in the bias or anode supply circuit of a vacuum tube and adjust the operating potential to obtain compensation.

I have found that within the limits of variations of line voltage which are usually present in power lines, such as for example a variation up to as much as 10% and even 15% above or below an assumed normal line voltage, that apparatus embodying the present invention will provide accurate test readings for vacuum tubes or transistors as the case may be.

The reason for non-linearity in the network characteristics is due to the fact that the percentage compensation of say an input signal to a device under test must be greater than the percentage variation of line voltage. In other words, a rise in line voltage of say ten percent cannot be compensated for by a simple ten percent drop in the input signal voltage to a vacuum tube under test. In case of such a rise in line voltage, the anode potential will rise as will the heater current for cathode. The net result is that more space current would tend to pass through the tube under test.

In addition, the increase in current passing through the tube results in a substantial change in the load on the source of current supplying the tube and various circuits. Such source of current, usually consisting of windings on a transformer core, have an internal impedance which will result in an overall complex change of operating conditions for the device under test. Some of the variations, such as for example impedance variation of the plate supply transformer winding, will tend to neutralize to some degree the changing operating conditions due to increased plate potential. A change in current will result in a change in potential drops through the many resistors usually necessary so that potentials available at the device under test may vary substantially. Accordingly it is generally necessary to overcompensate percentagewise any change in line voltage supplied to the tube tester during operation. In general, the non-linear network provides a sort of modulating action on the potential amplitude in the circuit or circuits containing the same.

The nature of the non-linear network or device will depend upon such factors as desired characteristics, cost and simplicity or ruggedness. As one example, an incandescent lamp, operating at a desired brightness may be used. As is well known, in an incandescent lamp having a metallic filament, the variation of resistance is non-linear at moderate filament temperatures if heating current varies. Usually the resistance variation may be quite substantial for a slight change in heating current at moderate filament temperatures. Another non-linear element is a gas discharge tube such as a neon tube or light. Other devices, such as for example ferro-magnetic cores operating at or near saturation and having one or more windings, may be designed so that non-linear impedance variations with changes in magnetizing current may be obtained. Also rectifiers and detectors have desirable non-linear characteristics and may be used. Tubes and transistors also may be used on non-linear parts of their curves. In addition there is a class of materials designated as thermistors. These materials have temperatures coefficients of resistance of a decidedly higher order than pure metals. For example a mixture of manganese oxide and nickel oxide may have a large negative coefficient.

Whether the non-linear device has a rising or falling non-linear characteristic is of no importance since a network may be so arranged as to reverse the sign of the response as desired.

In order that the invention may be understood reference will now be made to the drawings wherein various modifications are illustrated. It is understood that further variations may be made by those skilled in the art without departing from the scope of the invention, except as defined by the appended claims.

Referring to the drawings, Figure 1 is a block diagram of a conventional system for testing tubes or transducers.

Figure 9 is a circuit diagram of one form of the tube tester embodying the present invention.

Figures 10 to 12 inclusive are block diagrams of further modifications embodying the present invention.

Figure 1:
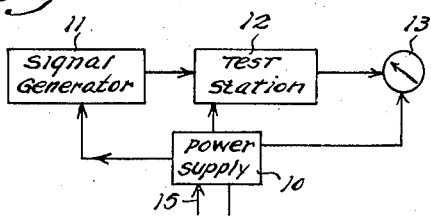

Referring first to Figure 1, a conventional tester for vacuum tubes or transistors is illustrated in block diagram. As a rule, the entire device may be disposed in a suitable cabinet and consists essentially of power supply 10, signal generator 11, testing station 12 and indicating means in the form of a meter system 13. As a rule power supply 10 consists of a transformer having a large number of windings for obtaining various voltages to be applied on various electrodes of various types of devices to be tested. In the case of vacuum tubes, it is necessary to provide different voltages for different kinds of tube types.

While signal generator 11 is shown as detached from the power supply, it may consist of one or more windings of the transformer plus voltage dividers, resistors, and the like. In practice, it is difficult to separate sharply the power supply from the signal generator. The usual complement of condensers, resistors, vacuum tubes and rectifiers is included in the power supply. The signal generator as a rule provides an alternating potential of a suitable value, said potential being applied to the device under test either by itself or superimposed upon some suitable bias potential.

Testing station 12 may consist of one or more sockets for accommodating various kinds of tubes or transistors. For convenience a tube tester will be considered. It is understood, however, that the general principles of the invention are applicable to transistors.

The output of the tube under test is fed to an indicating system which may include a volt meter. As a rule, the tester is so arranged that low potentials of the order of about five or six volts may be impressed upon the meter proper. In addition, the indicating system may have a connection from the power supply for energizing a rectifier or other means so that a simple volt meter of the direct current type may be used.

The entire tester usually is a portable unit which may be energized from line 15 connected to a conventional source of alternating current. Since most tube testers are energized from alternating current power lines, usually the so-called 110 volt lines, it will be assumed that 110 volts is normal. It is understood, of course, that while the various modifications of the invention are concerned with a tester which is adapted to be energized from an alternating current power line, the 110 volts constitutes merely an example. Other standard voltages are in use in different parts of the world and even in certain parts of the United States there are some 220 volt lines rather than 110 volt lines. Since it is simple to provide a tube tester for other line voltages, it will be understood that the general principles of the invention are applicable to testers adapted to be energized from alternating power lines irrespective of the frequency or normal voltage of the supply line.

Figure 2:
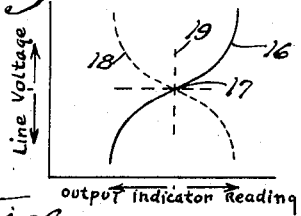
Figure 2 is a characteristic curve illustrating what happens in the testing of Figure 1 when the line voltage varies and illustrating a compensation curve.

Referring now to Figure 2, curve 16 in full lines illustrates how the output reading of indicating portion 13 of a conventional tester will vary with variation in voltage at lines 15. Point 17 on the curve is the ideal operating point and gives the correct output reading for a normal line voltage. As the line voltage increases, it will be seen that curve 16 goes up and to the right of point 17, the variation being non-linear. If the line voltage drops below normal, curve 16 drops and extends to the left of neutral point 17. Curve 16 is not necessarily symmetrical about point 17 but in general the curve is non-linear and is empirical.

In order to provide perfect compensation, some compensating means having a voltage characteristic illustrated by dotted curve 18 should be provided at the indicating system so that the resultant corrected reading will be dotted line 19, substantially straight and vertical through point 17.

Figure 3:
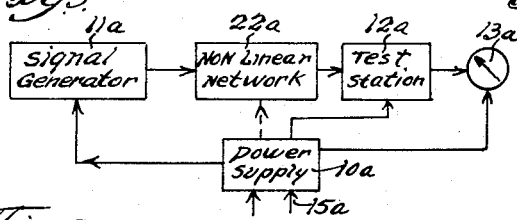
Figure 3 is a block diagram of one form of a system embodying the present invention.

In accordance with one form of the present invention, as Figure 3 shows, the system illustrated in Figure 1 has been modified by disposing a non-linear network 22a in the input channel of testing station 12a. Non-linear network 22a is fed from signal generator 11a. In practice, signal generator 11a may be a winding on a transformer in power supply 10a and the coupling between this winding and the transformer primary energized from line 15a will suffice and permit network 22a to operate. The remainder of the system illustrated in Figure 3 may generally speaking be similar to the conventional testing system illustrated in Figure 1. The coupling between power supply 10a and network 22a may be omitted since the signal generator functions to couple power supply 10a to network 22a. Network 22a may be passive, in the sense that it consists purely of passive elements as resistors, inductors, condensers. However, the network may be active and be provided with some source of potential such as a transformer winding coupled to power supply 10a.

Figure 4:
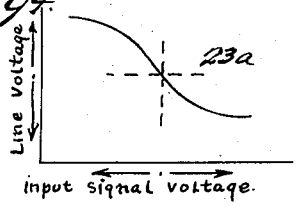
Figure 4 shows a curve for the system of Figure 3 illustrating the change in signal voltage fed into the device under test with respect to line voltage change.

Referring now to Figure 4, curve 23a shows how the voltage from the output of network 22a—this voltage is the signal input or part of a signal input to the testing station—varies with the voltage of line 15a. By proper design of network 22a, the signal voltage will drop in magnitude for a rise in the magnitude of the line voltage. It is to be understood that the plus sign for the line voltage indicates a rise in the magnitude of the voltage say from 110 volts to 120 volts and does not refer to the polarity of the voltage.

In case of a drop in the magnitude of the line voltage at the system in Figure 3, curve 23a indicates that the signal fed into testing station 12a will rise in magnitude. Curve 23a represents a desired change in the magnitude of signal going into the testing station to compensate for changes in potentials in the remainder of the testing system resulting from a change in line voltage.

In connection with Figure 3, it should be noted that the signal input and output for network 22a is alternating current with or without a D.C. bias component. If network 22a has a drooping non-linear characteristic, so that the output magnitude drops as the input magnitude rises—this is with reference to some arbitrary neutral value—then the entire signal from a source may be fed through a passive non-linear network. If non-linear network 22a, however, has a rising characteristic for a rising input voltage (the rise in output voltage must be faster than the rise of input voltage) then it is necessary to adjust the phase of the signal currents with respect to the network currents. When the two are out of phase, it is possible to produce an overall drooping characteristic.

Figure 5:
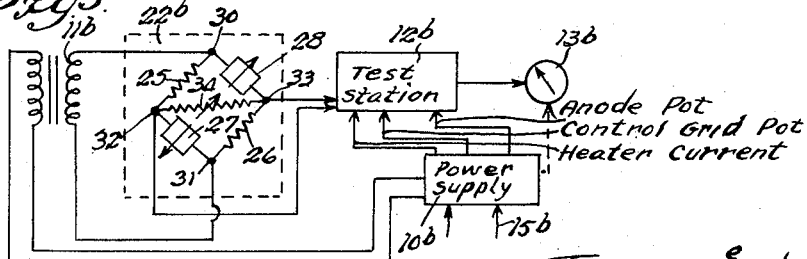
Figure 5 is a diagram partly in block form illustrating another modification of a testing system embodying the present invention.

Referring now to Figure 5, the system illustrated there is generally similar to the system illustrated in Figure 3 with the exception that network 22b is shown in detail as a bridge. Thus the bridge consists of arms 25, 26, 27 and 28. The bridge has input points 30 and 31 and output points 32 and 33. Arms 25 and 26 may be simple resistors of suitable values or inductors or capacitors. Arms 27 and 28 have non-linear elements. As indicated later, at least one non-linear network element is necessary although more may be non-linear if desired. As previously pointed out, the non-linear elements may consist of incandescent lamps as one example. It is possible to simplify the network and cut the bridge in half by omitting arms 26 and 28. The output points of the system would be at 31 and 32. However, a more powerful and symmetrical network action is provided with the bridge arrangement. A simple bridge arrangement will have arms 25 and 26 of resistors of equal value and arms 27 and 28 of similar non-linear elements.

Input points 30 and 31 of the bridge are connected to signal generator 11b which consists of a transformer winding coupled magnetically or electrically to power supply 10b. Winding 11b is here illustrated as provided with its own primary connected by wires to power supply 10b. In practice, however, it is more convenient to have winding 11b on the transformer core of the power supply transformer.

With the bridge arrangement as illustrated, let it be assumed that line source 15b has an abnormally high voltage. This will result in a correspondingly high voltage in winding 11b. Abnormally high signal voltage will be impressed across network points 30 and 31. This will result in abnormally heavy currents flowing through the network. Assuming that arm 25 has a different resistance than arm 27, there will be a difference of potential between output points 32 and 33. In a conventional bridge which is a linear network, the potential difference between points 32 and 33 will never vary. The non-linear character of the network will result in a change. The potential drop, through arm 25 for example, due to increased current will be abnormally great. The potential drop through arm 27, however, may remain substantially constant in spite of the increase in current. By proper proportion of the resistance of arm 25 and arm 27 and corresponding proportion of arm 26 and arm 28, it is possible for the difference in potential between points 32 and 33 to drop as the potential across points 30 and 31 rises.

In effect, the non-linear characteristic changes bridge arm ratios for different values of input potential. It is this change in arm ratio which is effective in producing output variation described above. The most efficient bridge operating point may be readily selected by a variable resistor in series with the bridge input.

The output characteristic of this non-linear network may be further modified by providing resistor 34 across the output terminals and this resistor may be conveniently of the manually variable type. Further control of the operating characteristics of this network may be provided by having a resistor across the input diagonal. Either diagonal resistor may be a non-linear element as a lamp in order to further control the output characteristic of the network.

Figure 5A:
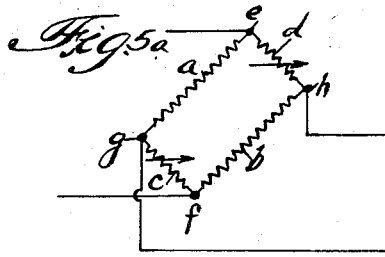
Figure 5A is a diagram of a non-linear network for illustrating a network action.

In order to explain the general operation of a non-linear bridge type of network, reference is made to Figure 5A. In this figure, four resistance arms $a$, $b$, $c$ and $d$ are connected in bridge relation. The bridge has diagonal points $e$, $f$, $g$, and $h$. For convenience in explaining the operation, bridge arms $a$ and $b$ are assumed to have equal resistance and bridge arms $c$ and $d$ are assumed to have equal resistance. The resistance of arm $a$ is greater than the resistance of arm $c$ and to illustrate this, the actual physical length of resistance $a$ on the drawing has been shown to be greater than the physical length of resistance $c$.

Let it be assumed that arms $c$ and $d$ are resistors (ballasts or barreters) which have a tendency to keep the current passing through the same substantially constant over a range of applied potential. Some variation is inherent in their operation but this variation may be disregarded. Also for simplicity let it be assumed that the input diagonal points $e$ and $f$ are connected to a source of constant direct potential. Let it be assumed that $e$ is positive to $f$ which may be considered ground. From simple equations, it is clear that the potential of bridge point $g$ to ground will be lower than the potential of point $h$ to ground. This means therefore that point $h$ is positive to point $g$. If the potential applied to the input of this network is increased, then $e$ will become more positive to grounded point $f$.

Since arms $c$ and $d$ tend to maintain a constant current, it follows that point $g$ will rise in potential with respect to point $f$, whereas point $h$ will drop in potential with respect to point $f$. Thus the potential difference between $h$ and $g$ will decrease. This may be visualized by considering that arm $c$ increases in length to raise point $g$ above point $f$. At the same time arm $d$ increases in length to drop point $h$ with respect to $f$. Since the current remains substantially constant, the length of arms $a$ and $b$ will remain constant in this example.

It is clear that the closer arms $c$ and $d$ approach in value to arms $a$ and $b$, the smaller will be the potential difference between points $h$ and $g$. If the value of resistances of arms $c$ and $d$ become greater than the resistances for arms $a$ and $b$, then point $g$ will be positive to point $h$ and the potential difference between $g$ and $h$ will rise with increase in potential to the bridge input. The polarity of the bridge output would be reversed in such case and the connection from the output of the bridge would have to be reversed.

While the above example illustrated in Figure 5A has been explained in connection with direct current, the same considerations apply to alternating currents.

The constant bridge elements may be pure resistors, capacitors, inductors or combinations thereof.

If it is desired to utilize one half the bridge, it is necessary to have a constant impedance in series with a non-linear device such as an incandescent lamp. By controlling the relative values of arms and bridge operating point and by taking the output across the non-linear device, it is possible to control the amount of potential difference at the output.

It is, of course, possible to provide complex operational characteristics to the network by having say two non-linear devices in series, said devices having different resistance values or having three of the arms of the bridge of non-linear resistors with the fourth arm a substantially simple resistor. Additional changes in the characteristic of the network may be made by connecting either simple or non-linear resistors across one or the other bridge diagonal or both.

Other non-linear devices instead of incandescent lamps may be used wherein the tendency may be to permit the current to vary not in proportion to the voltage change as is true in a simple resistor. For convenience the term non-linear device will be used to define a device whose impedance does not remain constant with changes in applied potential but may increase or decrease in any fashion, linear or non-linear.

Figure 6:
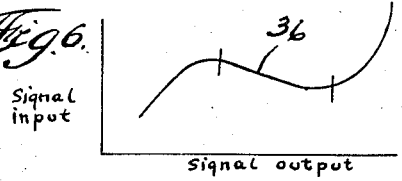
Figures 6 and 7 are curves illustrating the change in signal output to signal input in the non-linear network of portion of the system illustrated in Figure 5.
Figure 7:
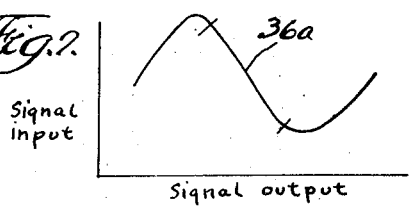

Referring now to Figure 6, there is illustrated a curve showing the variation of signal output from network 22a of Figure 5 with variation in signal input to this network. It will be noted that the central portion 36 of the curve between markers has a comparatively small slope where the signal output decreases with increasing signal input. Portion 36 of the curve would be the desired portion of the curve within which the variations of signals should be confined. The curve illustrated in Figure 6 illustrates how the network of Figure 5 operates when only one non-linear arm is provided, the remaining three arms being linear.

Where the opposite arms are non-linear a steeper characteristic is obtained as illustrated in Figure 7. Curve portion 36a between markers has a steeper characteristic with the signal output falling off quite sharply with respect to an increase in signal input. The slope of portions 36 and 36a in the two curves and the extent of the operating range may both be adjusted by controlling the amount of diagonal resistance such as illustrated in resistor 34 in Figure 5.

Figure 8:
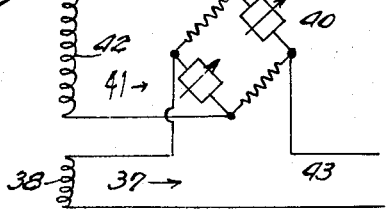
Figure 8 illustrates partly in diagram and partly in block form a further modification embodying the present invention.

Referring now to Figure 8, there is shown in block diagram a network and signal channel arrangement which is utilized in the detailed tester circuit illustrated in Figure 9. One signal channel 37 has signal source 38 connected thereto. Source 38 is here shown as a transformer winding but in practice may be any source of alternating current or rectified current for bias purposes or for forming part of the tester signal to be applied to the tester station.

Non-linear network 40 has its output connected in series with channel 37 and the network input is connected in channel 41 provided with signal source 42. Signal source 42 is here illustrated as a transformer winding but may, of course, be any source of alternating current or rectified current.

Channel portion 43 will contain signals which are a composite of signals originating from sources 38 and 42, respectively. Irrespective of whether one or both of these sources provides alternating currents, if the amplitude of a signal from source 38 increases for some reason, then it is necessary that composite signal in channel portion 43 decrease. This decrease may be obtained by the action of non-linear network 40. If non-linear network 40 has a rising characteristic—the output rises faster than the input voltage—than it is necessary to reverse the phase, if alternating currents are used, or polarity, if rectified currents are used so that the mixed signal in channel portion 43 will have a dropping characteristic.

On the other hand, if network 40 has a dropping characteristic, then a straight series relationship including proper phasing and polarity are necessary to be sure that the composite signal in channel portion 43 drops in amplitude with rise in signal amplitude at the sources of signals. As will be shown later in the description of Figure 9, the circuit illustrated in Figure 9 uses alternating currents for signal source 38 and 42 with the phase reversed and network 40 so poled that the output potential has a rising characteristic with reference to the input of the bridge.

Referring now to Figure 9, a detailed wiring diagram of an embodiment of the invention is given.

Inasmuch as the wiring diagram utilizes conventional symbols a detailed description of the entire circuit is not believed to be necessary. As is clearly apparent, the power supply consists of a transformer having a tapped primary and having five separate secondary windings. The tapped primary is provided so that an unusually low heating current may be applied to the heater of a vacuum tube cathode for life testing. The abnormally low heating current is applied when the full primary winding is used. The tap is for normal heater current. Switch 45 is the operating switch for the entire tester. Switch 46 has sections 46a to 46g inclusive and sections are operated to provide different testing circuits.

The transformer has secondary windings 47 to 51 inclusive. Windings 47 is center tapped and the terminals of this winding supply heater current to the cathode of double diode 53.

Transformer winding 50 corresponds to winding 42 in Figure 8 and has connected across the terminals thereof a bridge consisting of resistors 55, 56, 57 and 58 arranged as shown in the drawing. Resistors 55 and 56 are simple resistors whose values remain fixed unless manually changed. Resistors 57 and 58 are of the type whose values inherently vary. They may be lamps. The portion of transformer winding 51 across which resistor R-14 is bridged corresponds to signal source 38 in Figure 8. Windings 50 and 51 are oppositely phased. The input potential to the bridge supplied by winding 50 in this instance is larger than the bucking potential coming from the bottom portion of winding 51.

The various terminals to the right of the wiring diagram and designated as "cathode" and so on up "diode plate" are for connection to various terminals of vacuum tube sockets. For example, certain types of tubes may require a low bias so that this particular terminal on the wiring diagram will be connected to the necessary terminals on vacuum tube sockets accommodating the particular types of tubes requiring such a bias. Other sockets for accommodating different types of tubes may be connected to the "medium bias." Tube sockets accommodating tubes having screens will have the screen terminal connected to the appropriate socket terminals. Where diodes are to be tested, the appropriate terminal in this wiring diagram will be connected to the appropriate terminals of sockets accommodating these types of tubes. Thus in an actual embodiment of the tester shown in this circuit diagram there may be as many as thirty vacuum tube sockets wired up. One socket may accommodate one or more different types of tubes. As an example, one socket for accommodating one or more types of tubes having similarly wired bases may require connections to the cathode, the two heater terminals, the high signal terminal and the plate terminal.

As the wiring diagram indicates, the power for the entire tester is controlled by on-off switch 45. This switch controls the current through the primary of transformer T-1. In addition to switch 45, there is provided switch 46a which is adapted to cooperate with six additional switch sections 46b to 46g inclusive. The various positions of these switch sections provide different circuit conditions for testing. Switch section 46a is a two position switch wherein the movable contact V cooperates with contacts W or X. With switch 46a in the position shown, the line voltage is impressed across the entire primary winding. Assuming that the remaining switch sections are disposed properly, an abnormally low voltage will be available for the heater of any tubes under test for life testing. For normal testing, switch section 46a is disposed so that contacts V and X are connected. Thus the secondary voltages in the transformer will be at normal values for energizing and testing a tube.

The power supply for the entire tube tester includes transformer T-1 having secondaries 47 to 51 inclusive. Secondary 51 has a number of taps going to contacts which carry numbers which may indicate the voltage output with reference to the bottom terminal of secondary 51. These various contacts are arranged to provide proper voltages for particular tubes. Thus wiper 52 cooperates with these contacts and is shown as touching contact 7 in which position a potential of substantially seven volts may be applied to the heater of a vacuum tube. By turning wiper 52 to another position, a different voltage will be applied as required.

Secondary winding 50 has connected across the terminals thereof a non-linear network for providing a signal voltage which will vary in an opposite sense to the voltage generated by secondary 50 in response to line voltage variations. Thus the network consists of resistors R4, R5 and lamps PL-1 and PL-2, arranged in the form of a bridge having input terminals 55 and 56 and output terminals 57 and 58.

The network involving rectifier SR-1 is for the purpose of providing a high potential upon a screen electrode when a tube so requires. The arrangement of the rectifiers as illustrated provides for voltage doubling across condensers C-1 and C-2 in series. When switch section 46d is operated so that contacts E and C are connected together then the rectified potential across C-1 is applied between the cathode and screen of a tube. The potential developed across condenser C-2 is reversed in polarity and may be used to provide biasing potentials by virtue of the drops at resistors R8 to R12 inclusive.

In order that the various testing positions may be disclosed, the following table of switch positions for switch sections 46a to 46g inclusive are hereby given.

For testing a short

A—C  D—E  F—G  K—L  Q—R and

V—X are the switch connections which should be established.

For testing mutual conductance (Gm) the switch positions should be as follows:

A—B  E—C  F—G  K—L  Q—T  R—S  V—X should be established.

For life testing the following switch connections should be established.

A—B  E—C  F—G  K—L  Q—T  R—S  V—W

A tube may also be tested for gas by establishing the following switch connections:

A—B  E—C  Q—P  R—H  V—X

A tube tester may be constructed by using the following values in the components of the circuit:

R-1 and R-2 both 130 ohms
R-3 is 1,000 ohms
R-4 and R-5 are each 16 ohms
R-6 is 100,000 ohms
R-7, R-8, R-20, R-21 and R-22 are each 12,000 ohms
R-9 resistor part of a potentiometer control is 1,000 ohms
R-10 is 10 megohms
R-11 and R-12 are each 510 ohms
R-13 is 220 ohms R-14 is 100 ohms resistor portion of a potentiometer control
R-15 is 5.6 megohms
R-16 is 470,000 ohms
R-17 is 56,000 ohms
R-18 is 180,000 ohms
R-19 is the 40 ohm resistor part of a potentiometer
C-1, C-2 and C-3 are each 20 mfd. 250 volt capacitors
C-4 is .005 mfd. 600 volt capacitor
C-5 is a 250 mfd. 6 volt capacitor
NE-1 is a neon lamp available in the market as type NE-51
V-1 is type 83 tube
V-2 is a type 6AT6 vacuum tube
M-1 is a meter
PL-1 PL-2 are each a miniature lamp available in the market as No. 44
SR-1 and SR-2 are each 50 ma. selenium rectifiers The transformer windings have the following open circuit R.M.S. voltages:

Winding 47—5 volts across the end terminals
Winding 48—180 volts across the end terminals and 10 volts between the tap and the bottom (red-green) terminal
Winding 49—180 volts
Winding 50—6.3 volts
Winding 51—150 volts across the outer terminals, the tap voltages being marked with reference to the bottom black terminal.

The various values given above are the commercial ratings and are subject to some variations.

When tube transconductance is being tested, the arrangement is such that the space current passing through the tube under test is measured by meter M. The arrangement of resistors R-1 and R-2 in the meter circuit is provided for the purpose of balancing the meter.

In the test for a short circuit, any undesirable connection between electrodes of the vacuum tube under test will cause a circuit to be established in which lamp NE-1 may light up and thus indicate a short.

The life test is obtained by reducing the heater voltage. The gas test tests for grid emission and for gas in a tube and really tests for current in the grid circuit. In connection with this gas test, any grid to cathode current in the tube under test will cause sufficient current to pass through R-O to result in space current through V-2 between the cathode and the two parallel connected anodes in the rectifier part of this tube. Tube V-2 will thus act as a direct current amplifier and cause a deflection in meter M.

Referring now to Figure 10, there is illustrated in block diagram a modified version of applicant's invention wherein the non-linear network 22c is disposed in the output channel of the tube or transistor under test. Non-linear network 22c must be so disposed in the channel and have such characteristic that with increase in line voltage at 15c the current or potential fed into meter 13c will be reduced to provide compensation. Thus network 22c may be across the channel and have a dropping characteristic at the output with increased potential at the input. The arrangements as illustrated in Figure 8 may also be used.

Referring now to Figure 11, the same general system is illustrated with the exception that non-linear networks 22d and 22c are respectively in the input and output of test station 12d.

As have been heretofore indicated, it is also possible to introduce compensation by means of one or more non-linear networks in the energizing circuits for the tube or transistor under test as distinguished from the input and output channels. Thus, for example, a conventional three electrode vacuum tube has cathode, control grid and anode or plate. The input channel for test signals tube will terminate at the control grid and cathode. The output channel is connected to the plate and cathode. However, with relation to the cathode, the control grid may be operated with some particular bias potential and the plate with reference to the cathode must have a suitable source of potential. It is possible to provide compensation for a change in signal amplitude applied to the input of the tube or a change in any of the operating potentials of the tube because of poor regulation in the power supply by deliberately changing the bias potential or anode potential or both.

If the signal amplitude should happen to increase above normal, then compensation may be provided by increasing the negative bias on the control grid or decreasing the plate potential or both. As illustrated in Figure 9, a tube tester will have rectified bias potential derived from the power supply consisting of the transformer and associated components. Thus any change in transformer output due to any line voltage change or change in load upon the transformer or both will have some effect upon the magnitude of the bias potential. By providing the non-linear network in the bias potential system, it is possible for the output of the network to provide a bias potential which varies in a desired manner and to a desired degree. The same is true of the plate potential supply circuit.

Referring to Figure 12 there is shown a block diagram illustrating a general system wherein a non-linear network may be provided in one or more of the test station energizing circuits as distinguished from the input and output channels for the device under test. In Figure 12 signal generator 11g feeds a signal to test station 12g. Test station 12g is connected to power supply 10g which is energized from alternating current line 15g. In the case of a vacuum tube to be tested at 12g, the power supply would supply heater current, bias for either the cathode or control grid, suitable potentials for plate and additional electrodes such as screens and a cathode return.

As illustrated in Figure 12, non-linear networks 22g and 23g may be provided in the circuits extending from the power supply for bias purposes (either to the cathode or to the control grid depending upon which electrode has the bias potential applied thereto) and to the plate supply circuit. It is even possible to provide a non-linear network in the heater supply system so that heater current for the cathode will be varied in a manner to provide suitable compensation.

It is also possible to combine the use of a non-linear network in one or both of the channels as heretofore described with the use of one or more non-linear networks in the energizing circuits as illustrated in block diagram in Figure 12.

The system illustrated in Figure 9 has been found to work quite satisfactorily in actual practice and makes possible a tester which is simple and economical to manufacture and which provides accurate readings under conditions normally encountered by a serviceman in connection with electronic equipment using vacuum tubes. A corresponding tester for transistors may be readily designed. Such a tester does not require the many different potentials for energizing the heaters. It is also possible to use the tester of Figure 9 in connection with transistors by omitting the heater connections and providing suitable potentials required by such devices.

What is claimed is:

1. A tester for an electronic amplifier having a number of electrodes including a control electrode and an output electrode, said tester comprising an unregulated power supply including a transformer having a primary winding to be energized by an alternating current power line and having a plurality of secondary windings, a signal circuit energized by one secondary winding for supplying said control electrode, a current supply circuit energized by another secondary winding for supplying current at a suitable potential to said output electrode of said amplifier, a resistance bridge having four arms with a non-linear resistance element in each of two non-adjacent arms, said bridge having two diagonal terminals connected to be energized from a third winding, connections disposing the remaining bridge terminals in series with one of said two amplifier supply circuits, and indicating means connected to the amplifier output, said bridge being poled so that the non-linear bridge output compensates for the lack of regulation in said power supply or variation in line voltage.

2. A tester for an electronic amplifier having a number of electrodes including a control electrode and an output electrode, said tester comprising an unregulated power supply including a transformer having a primary winding to be energized by an alternating current power line and having a plurality of secondary windings, a signal circuit energized by one secondary winding for impressing a test signal on said control electrode, a current supply circuit energized by another secondary winding for supplying current at a suitable potential to said output electrode of said amplifier, a resistance bridge having four arms with a non-linear resistance element in each of two non-adjacent arms, said bridge having one pair of diagonal terminals constituting the input and the other pair of diagonal terminals constituting the output, connections between a third winding and the bridge input terminals for energizing the bridge, connections disposing the output bridge terminals in series with the signal circuit and indicating means in the amplifier output circuit, said bridge output being poled so that the non-linear bridge output compensates for lack of regulation in said power supply or variation in line voltage.

3. The tester according to claim 2 wherein each non-linear resistance element comprises an incandescent lamp.

4. A tester for a vacuum tube having a cathode, control electrode and anode, said tester comprising an unregulated power supply including a transformer having a primary winding to be energized by an alternating current power line and having a plurality of secondary windings, a signal circuit energized by one secondary winding for impressing alternating signal potentials between said control electrode and cathode, a current supply circuit energized by another secondary winding for supplying current at a suitable potential to said anode and cathode, a resistance bridge having four arms including a non-linear resistance element in each of two non-adjacent arms, said bridge having two diagonal terminals as the input connected across a third winding, connections disposing the remaining two bridge terminals in series in the signal circuit, and indicating means energized by said amplifier output, said bridge being poled so that the non-linear bridge output provides compensation in the signal circuit for lack of regulation in said power supply or variation in line voltage.

References Cited in the file of this patent

UNITED STATES PATENTS

| | | |
|---|---|---|
| 280,563 | Bradley | July 3, 1883 |
| 1,917,474 | Von Ohlsen et al. | July 11, 1933 |
| 1,927,689 | Miessner | Sept. 19, 1933 |
| 1,940,874 | Metz | Dec. 26, 1933 |
| 2,129,524 | Camilli | Sept. 6, 1938 |
| 2,494,369 | Sunstein | Jan. 10, 1950 |
| 2,571,439 | Glass | Oct. 16, 1951 |
| 2,816,268 | Lappin | Dec. 10, 1957 |